(12) United States Patent
Sternberger et al.

(10) Patent No.: US 8,628,128 B2
(45) Date of Patent: Jan. 14, 2014

(54) TERTIARY LOCK FOR PIVOT DOOR THRUST REVERSER

(75) Inventors: Joe E. Sternberger, Wichita, KS (US); Michael Lallement, Wichita, KS (US)

(73) Assignee: Spirit AeroSystems, Inc., Wichita, KS (US)

( * ) Notice: Subject to any disclaimer, the term of this patent is extended or adjusted under 35 U.S.C. 154(b) by 776 days.

(21) Appl. No.: 12/427,516

(22) Filed: Apr. 21, 2009

(65) Prior Publication Data

US 2010/0264676 A1  Oct. 21, 2010

(51) Int. Cl.
*E05C 19/00* (2006.01)
(52) U.S. Cl.
USPC .......................................................... 292/302
(58) Field of Classification Search
USPC ........................................ 292/302; 60/226.2
See application file for complete search history.

(56) References Cited

U.S. PATENT DOCUMENTS

| | | | | |
|---|---|---|---|---|
| 2,780,057 A * | 2/1957 | Stavert | ................... | 239/265.19 |
| 4,424,669 A * | 1/1984 | Fage | ................... | 60/230 |
| 5,224,342 A * | 7/1993 | Lair | ................... | 60/230 |
| 5,735,557 A * | 4/1998 | Harvey | ................... | 292/216 |
| 5,819,527 A * | 10/1998 | Fournier | ................... | 60/226.2 |
| 6,138,449 A | 10/2000 | Hudson | | |
| 6,604,355 B1 * | 8/2003 | Sternberger | ................... | 60/226.2 |
| 2008/0054123 A1 * | 3/2008 | French et al. | ................... | 244/129.5 |

* cited by examiner

*Primary Examiner* — Kristina Fulton
(74) *Attorney, Agent, or Firm* — Hovey Williams LLP (57) ABSTRACT

A locking assembly partially housed between a forward bulkhead and an aft bulkhead of an aircraft's fan duct for preventing a pivot door of a thrust reverser from inadvertently opening during flight and providing over-stow assistance during opening and closing of the pivot door. The locking assembly may comprise a lock arm configured to mate with a lock arm receiver fixed to the pivot door. The lock arm may have a first portion pivotally attached to a locking assembly housing mounted between the bulkheads, and a second portion extending aftward through an opening in the aft bulkhead. When the lock arm is pivoted away from the pivot door, the second portion may be configured to push inward against the lock arm receiver, urging the pivot door inward while simultaneously moving the lock arm away from the lock arm receiver to allow the pivot door to open outward.

11 Claims, 7 Drawing Sheets

TERTIARY LOCK FOR PIVOT DOOR THRUST REVERSER

BACKGROUND

1. Field

The present invention relates to aircraft thrust reversers. More particularly, the invention relates to a locking mechanism for a pivot door of a thrust reverser.

2. Related Art

A thrust reverser is a part of an aircraft typically incorporated into a fan duct surrounding an engine to reverse the aircraft's thrust during landing. Pivot door type thrust reversers are commonly used on corporate or business jet applications, and are designed to pivot to an open position when deployed, creating a resistance opposing engine thrust. However, inadvertent pivot door deployment in flight can be catastrophic to the aircraft. Therefore, door locks for maintaining the pivot doors in a stowed position during flight are required. To meet regulatory requirements, each pivot door typically comprises or mates with three locks.

Figure 1:
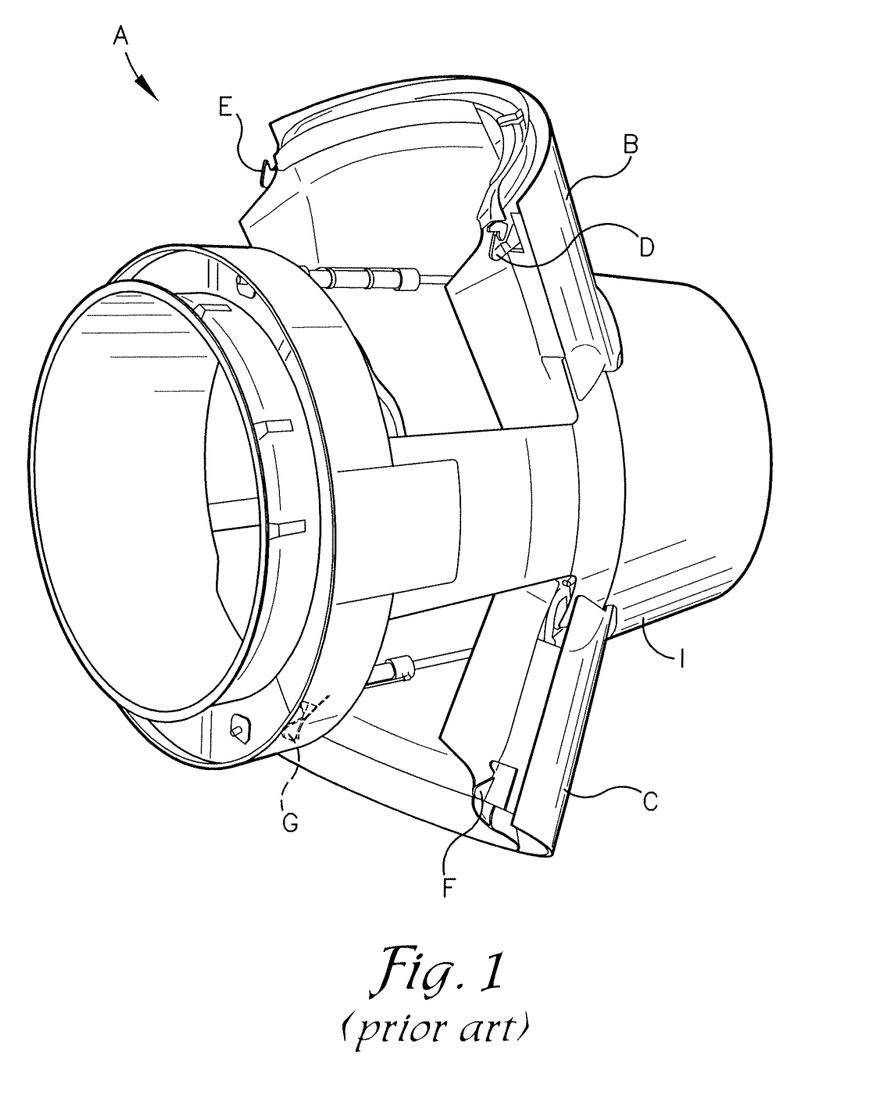
FIG. 1 is a perspective view of a prior art pivot door thrust reverser.
Figures 2, 3:
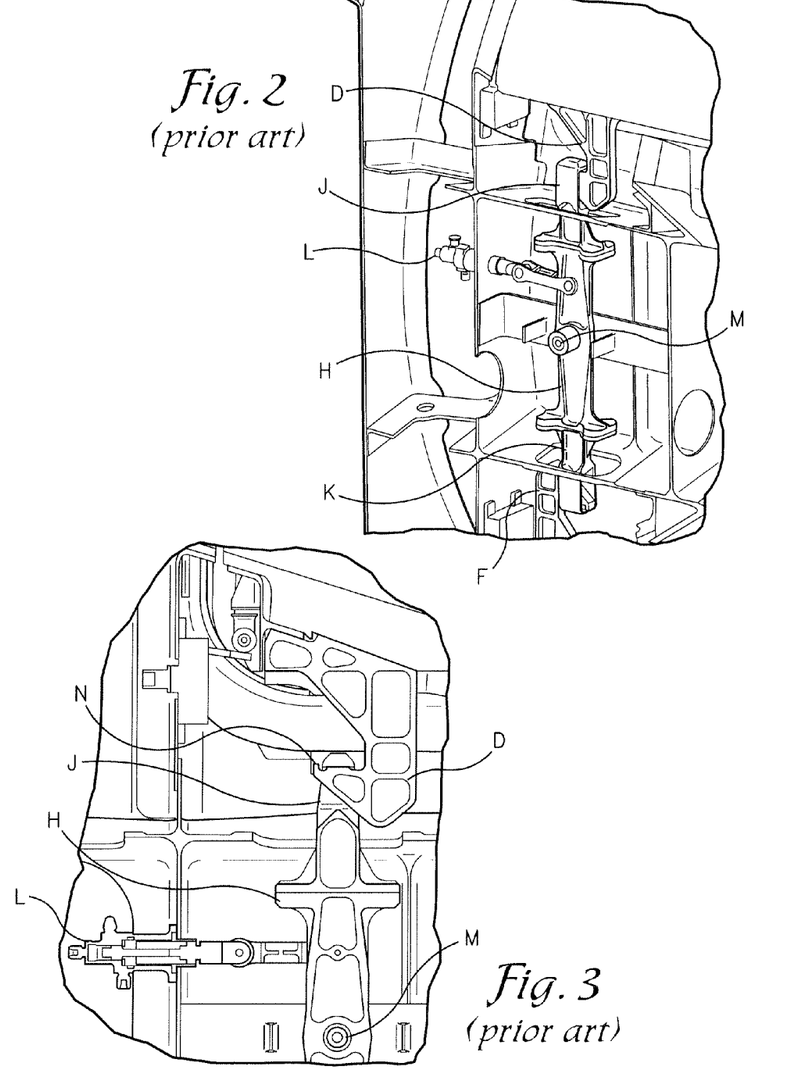
FIG. 2 is a fragmentary perspective view of a prior art primary lock of the pivot door thrust reverser of FIG. 1 with an outer wall removed.
FIG. 3 is a fragmentary, cross-sectional elevation view of the primary lock of FIG. 2 illustrating a prior art hook safety tab.

For example, as illustrated in FIGS. 1-3, a thrust reverser (A) may have an upper pivot door (B) and a lower pivot door (C). The upper pivot door (B) may have a first upper door hook (D) and a second upper door hook (E), and the lower pivot door (C) may have a first lower door hood (F) and a second lower door hook (G). These hooks (D-G) may be configured for mating with a primary lock arm (H) housed within a fixed structure (I) of the thrust reverser (A). The primary lock arm (H) may have an upper primary lock arm receiver (J) and a lower primary lock arm receiver (K) at either end for receiving one of the upper door hooks (D,E) and one of two lower door hooks (F,G). A primary lock arm actuator (L) may pivot the lock arm (H) about a center pivot (M) such that the hooks (D-G) may be released from the lock arm (H), thereby unlocking the pivot doors (B,C). However, notice in FIG. 3 that each hook (D-G) may also comprise a hook safety tab (N), which may prevent the hook (D-G) or the receiver (J,K) from inadvertently sliding out of place. Therefore, in order for the primary lock arm (H) to release the upper door and lower door hooks (D-G), the door (B,C) must be slightly "overstowed" during opening and again during closing. Overstowing a pivot door (B,C) involves closing it slightly farther than a typical closed position, and then allowing the door (B,C) to move back into its typical closed position once the primary lock arm (H) is actuated to the desired orientation.

In addition to the two locks provided by the upper door hooks (D,E) and the lower door hooks (F,G), a third lock (not shown), referred to as a tertiary lock, may be used. The tertiary lock for each of the doors (B,C) are positioned in a center location on each door (B,C) with respect to the corresponding upper door hooks (D,E) and the corresponding lower door hooks (F,G). Tertiary locks are generally mechanically complex and may also be subject to a large amount of load if the primary and/or secondary locks fail.

SUMMARY

The present invention provides a locking assembly, such as a tertiary lock, for locking a pivot door of a thrust reverser to a forward bulkhead and an aft bulkhead of an aircraft fan duct, to prevent the pivot door from inadvertently opening. The apparatus may comprise a lock housing fixed to and positioned between the forward and aft bulkheads, a lock arm, a lock arm/housing pivot pivotally attaching the lock arm to the lock housing, a lock arm receiver, a roller attached to the lock arm, an actuator assembly pivotally connected to the lock arm and the lock housing, and a spring mandrel assembly.

The lock arm may comprise a first portion fixed to and positioned inward of the lock housing and a second portion configured to extend outward of the lock housing through an opening of the aft bulkhead. The first portion of the lock arm may be substantially perpendicular to the second portion of the lock arm. The lock arm receiver may be fixed to the pivot door and configured for mating with the second portion of the lock arm and/or the roller. The roller may be attached to the second portion of the lock arm and configured to rotatably engage the lock arm receiver. The lock arm may also comprise a sealing portion positioned to form an airtight seal with the aft bulkhead around the opening through which the second portion of the lock arm extends. Additionally, the lock arm may comprise a manual release fixture for receiving a standard wrench to manually move the lock arm into an unlocked position.

The actuator assembly may bias the lock arm toward the pivot door to mate with the lock arm receiver in a locked position and may also pivot the lock arm away from the lock arm receiver into an unlocked position. The second portion of the lock arm may be configured to travel along a rotational path about the lock arm/housing pivot such that when the lock arm is pivoted away from the pivot door, the second portion pushes inward against the lock arm receiver, thereby urging the pivot door inward while simultaneously moving the lock arm away from the lock arm receiver, allowing the pivot door to open in a generally outward direction.

The lock arm receiver may further comprise a roller plate angled outward relative to the fan duct and a door stow engagement ramp adjacent the roller plate and angled inward relative to the fan duct. The roller may be configured to rotatably engage the door stow engagement ramp and then rotatably engage the roller plate as the pivot door moves inward toward the fan duct to a closed position.

The spring mandrel assembly may be configured to provide a load path between the lock housing and the lock arm. The spring mandrel assembly may comprise a mandrel pivotally and slidably connected to the lock housing and pivotally connected to the lock arm, and a spring attached to the mandrel. The mandrel may slide away from the aft bulkhead as the lock arm is pivoted away from the pivot doors, simultaneously compressing the spring. The spring may also bias the roller toward the lock arm receiver.

The locking assembly may additionally comprise an indicator switch assembly and a switch plate for cooperatively indicating whether the lock arm is in the locked position or the unlocked position. The indicator switch assembly may comprise a depressable switch, a switch housing, and a switch roller rotatably attached to the depressable switch. The switch housing may be fixed to the lock housing. The switch plate may be fixed to the lock arm and comprise an upper portion and a lower portion. The switch plate may be positioned adjacent the switch roller such that as the lock arm rotates from a locked position to an unlocked position the roller rolls from the upper portion to the lower portion of the switch plate or from the lower portion to the upper portion of the switch plate. The switch plate may be configured to cause the depressable switch of the indicator switch assembly to depress inward toward the switch housing when the upper portion of the switch plate is in contact with the switch roller.

An exemplary method of unlocking a pivot door of a thrust reverser, which is locked to a forward bulkhead and an aft bulkhead of a fan duct, may comprise applying a lateral force to a pivot arm in a direction toward the forward bulkhead such that a first portion of the lock arm is directed substantially upward while a roller attached to a second portion of the lock arm is simultaneously directed substantially downward. The roller may be configured to follow a rotational path such that it urges the pivot door inward before the lock arm pivots far enough to release a lock arm receiver attached to the pivot door. The lateral force may be applied by an actuator assembly rotatably attached to the pivot arm at one end and rotatably attached to a fixed structure relative to the forward and aft bulkheads at another end. The method may further comprise the steps of pivoting the actuator assembly in an opposite rotational direction than a rotational direction of the lock arm, and pivoting a spring mandrel, pivotally connected to the lock arm and pivotally and slidably connected to the fixed structure, in an opposite rotational direction than the rotational direction of the lock arm. The lock arm may urge the spring mandrel to slide forward as it simultaneously pivots. The method may also comprise the step of actuating a switch based on a position of the lock arm.

This summary is provided to introduce a selection of concepts in a simplified form that are further described below in the detailed description. This summary is not intended to identify key features or essential features of the claimed subject matter, nor is it intended to be used to limit the scope of the claimed subject matter.

These and other important aspects of the present invention are described more fully in the detailed description below.

BRIEF DESCRIPTION OF THE DRAWINGS

Embodiments of the present invention are described in detail below with reference to the attached drawing figures, wherein.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Figure 4:
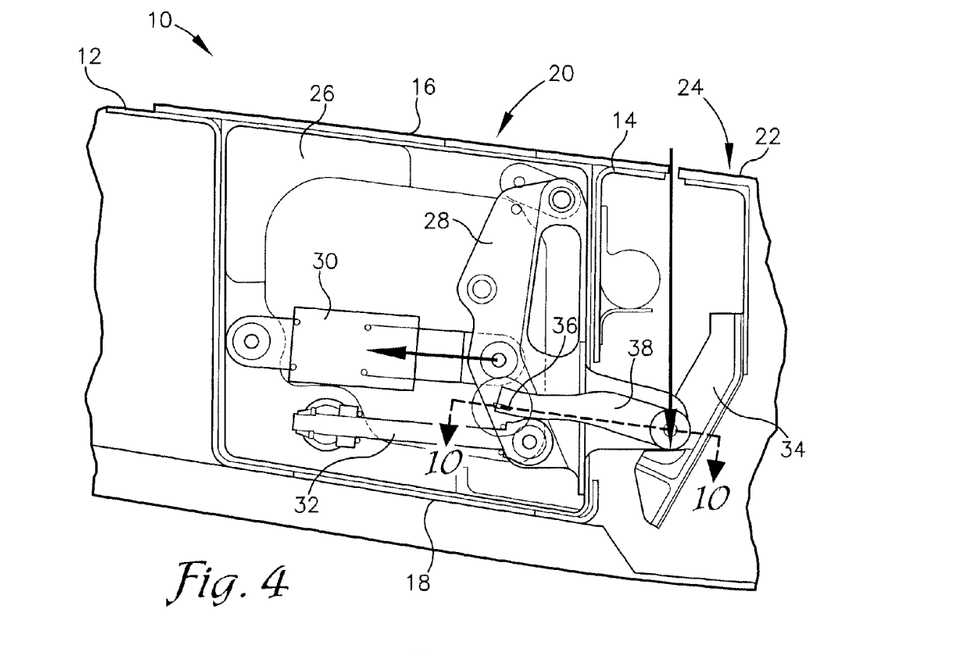
FIG. 4 is a fragmentary, cross-sectional elevation view of a locking assembly constructed in accordance with an embodiment of the present invention, illustrating a lock arm of the locking assembly in a locked position.
Figure 5:
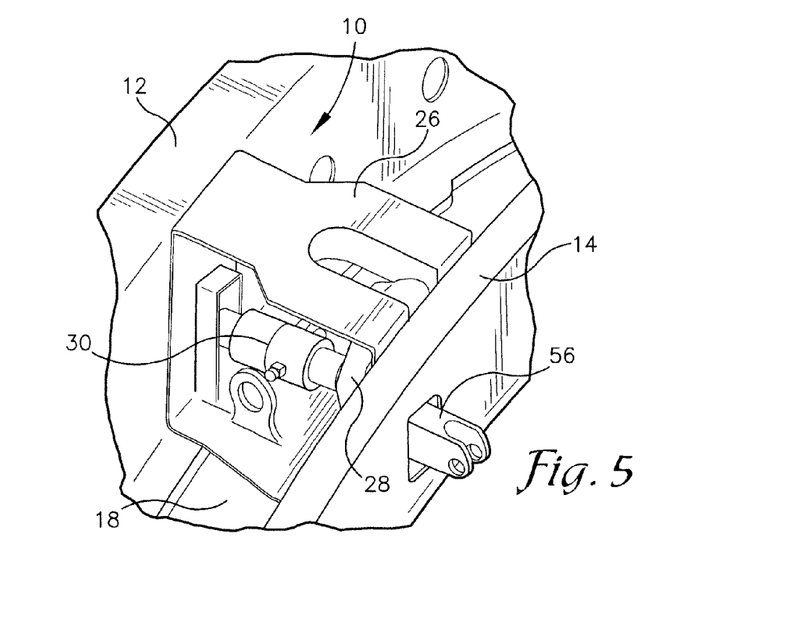
FIG. 5 is a perspective view of the locking assembly of FIG. 4.

The present invention illustrated in FIGS. 4-5 is a locking assembly 10, such as a tertiary lock, at least partially housed between a forward bulkhead 12, an aft bulkhead 14, an outer wall 16, and an inner wall 18 of an aircraft's fan duct 20. The locking assembly 10 may be configured to mate with at least a portion of a pivot door 22 of a thrust reverser 24, to prevent the pivot door 22 from inadvertently opening during flight. The locking assembly 10 may comprise a locking assembly housing 26, a lock arm 28, a lock arm actuator assembly 30, a spring mandrel assembly 32, a lock arm receiver 34, an indicator switch assembly 36, and a switch plate 38.

Figure 6:
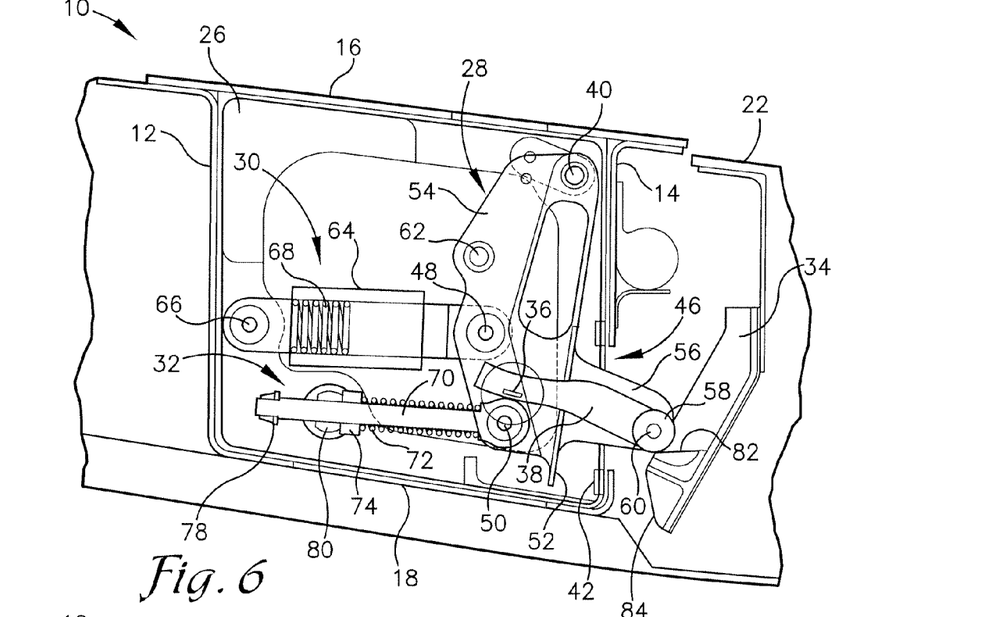
FIG. 6 is a fragmentary, cross-sectional elevation view of the locking assembly of FIG. 4, illustrating the lock arm being actuated away from a pivot door of a thrust reverser and assisting in overstowing the pivot door.
Figure 7:
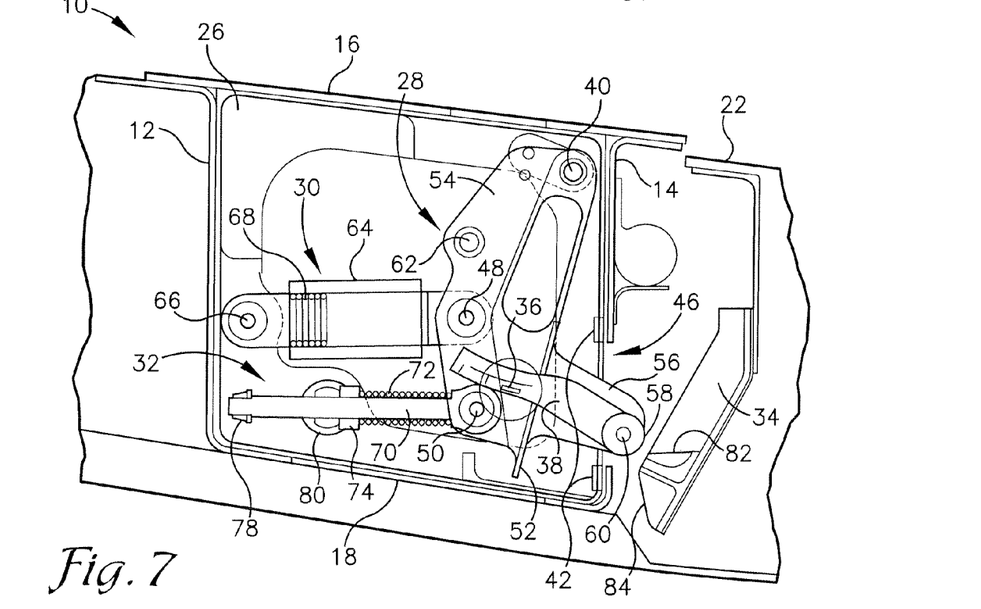
FIG. 7 is a fragmentary, cross-sectional elevation view of the locking assembly of FIG. 4, illustrating the lock arm in an unlocked position.

The locking assembly housing 26 may be mounted to or integral with the forward bulkhead 12 and the aft bulkhead 14, and may be slightly off-center from a center of the pivot door 22. As illustrated in FIGS. 6-7, the locking assembly housing 26 may comprise or have mounted thereto a lock arm/housing pivot 40, a pressure seal 42. The lock arm/housing pivot 40 may be configured to pivotally support the lock arm 28. For example, the lock arm/housing pivot 40 may be a pin extending through the lock arm 28 and fixed to the locking assembly housing 26, such that the lock arm 28 may pivot in relation to the locking assembly housing 26.

The locking assembly housing 26 may also be configured to pivotally support the lock actuator assembly 30, pivotally support the spring mandrel assembly 32, and fixedly support the indication switch assembly 36, as later described herein. The locking assembly housing 26 may provide a structural load path to react and transfer lock arm 28 loads to the forward bulkhead 12 and the aft bulkhead 14. The pressure seal 42 may be comprised of closed-cell foam or any other material and may border an opening 46 in the aft bulkhead 14 through which a portion of the lock arm 28 extends. A portion of the lock arm 28 may be pressed into the pressure seal 42 when the locking assembly 10 is in a locked position, in order to seal the opening 46 in the aft bulkhead 14 to prevent fan duct pressure from leaking out of the fan duct 20.

The lock arm 28, as illustrated in FIGS. 6-9, may comprise the lock arm/housing pivot 40, a lock arm/actuator pivot 48, a lock arm/spring mandrel pivot 50, a sealing portion 52, a first portion 54 inward of the sealing portion 52, a second portion 56 extending outward of sealing portion 52 through the opening 46, a roller 58, a roller pin 60, and a manual release fixture 62. The lock arm/housing pivot 40, as described above, may join the housing 26 to the lock arm 28. For example, the lock arm/housing pivot 40 may be attached to the housing 26 proximate the aft bulkhead 14. The lock arm/actuator pivot 48 may pivotally attach the lock arm 28 to the lock arm actuator assembly 30 for actuating the lock arm 28 to release the lock arm receiver 34 to allow the pivot door 22 to open. The lock arm/spring mandrel pivot 50 may pivotally attach the lock arm 28 to the spring mandrel assembly 32 to provide a redundant load path.

The sealing portion 52 may be sized to sufficiently cover the opening 46 when the locking assembly 10 is in a locked position. Particularly, the sealing portion 52 may be configured to seal up the opening 46 through which the second portion 56 of the lock arm 28 and the roller 58 extend to mate with the lock arm receiver 34. As described above, this sealing portion 52 may prevent fan duct pressure from leaking out of the fan duct 20.

The first portion 54 inward of the sealing portion 52 may be positioned between the forward bulkhead 12 and the aft bulkhead 14 in both the locked position (FIG. 4) and an unlocked position (FIG. 7). The first portion 54 may include the lock arm/housing pivot 40, the lock arm/actuator pivot 48, and the lock arm/spring mandrel pivot 50. The second portion 56 may extend outward of the sealing portion 52 and between the pivot door 22 and the aft bulkhead 14 when in the locked position. However, the second portion 56 may be at least partially retracted into an area between the forward bulkhead 12 and the aft bulkhead 14 through the opening 46 to unlock the locking assembly 10 and release the pivot door 22.

The second portion 56 may comprise the roller 58 and roller pin 60. The roller pin 60 may attach the roller 58 to the lock arm 28 such that the roller 58 may mate with at least a portion of the pivot door 22 and/or the lock arm receiver 34 during locking and unlocking of the locking assembly 10. In the locked position, the second portion 56 and the roller 58 may jut outward relative to the aft bulkhead 14 toward the pivot door 22 such that they block the lock arm receiver 34, preventing an outward, opening motion of the pivot door 22. Therefore, the first portion 54 and the second portion 56 may form a substantially L-shaped arm, with the first portion 54 substantially perpendicular to the second portion 56. However, the first portion 54 and the second portion 56 may be fixed at any angle relative to each other.

The manual release fixture 62 may be fixedly attached between the lock arm/housing pivot 40 and the lock arm/actuator pivot 48 and may be any fixture shaped to receive a standard open end wrench, such that applying force to the handle of the wrench may provide manual rotation of the lock arm 28 to manually release the pivot door 22. For example, the manual release fixture 62 may be a standard bolt or may have a similar size and shape of a standard bolt.

The lock arm actuator assembly 30, illustrated in FIGS. 6-7, may be operable to move the second portion 56 of the lock arm 28 inward, such that the second portion 56 may be at least partially located between the forward and aft bulkheads 12, 14. The lock arm actuator assembly 30 may comprise an actuator 64, an actuator/housing pivot 66, and a first spring 68. The actuator 64 may be a hydraulic actuator, a solenoid, a motorized device, and/or any other apparatus operable to retract the lock arm/actuator pivot 48 from a first position to a second position. The actuator assembly 30 may be pivotally attached to the locking assembly housing 26 by the actuator/housing pivot 66, allowing the proper motion of the lock arm 28 for assisting in overstow of the pivot door 22, as later described herein. Additionally, the first spring 68 may be attached to, located internal to, and/or wrapped around the actuator 64 and may be configured to provide sufficient force to bias or assist in biasing the lock arm 28 in a direction toward the aft bulkhead to prevent inadvertent lock movement.

The spring mandrel assembly 32, illustrated in FIGS. 6-7, may provide a redundant load path for loads applied to the lock arm 28 by the pivot door 22. The spring mandrel assembly 32 may comprise a mandrel 70, a second spring 72, a first spring stop 74, a second spring stop 78, and a spring stop/housing pivot 80. The mandrel 70 may be an elongated, rigid mandrel 70 with the lock arm/spring mandrel pivot 50 at one end and the second spring stop 78 at the other end. The mandrel 70 may be slidably attached to the spring stop/housing pivot 80. The second spring 72 may be attached to, attached within, and/or wrapped around the mandrel 70 between the lock arm/spring mandrel pivot 50 and the first spring stop 74. The spring stop/housing pivot 80 may pivotally attach the mandrel 70 to the locking assembly housing 26.

The second spring 72 may provide sufficient force to bias or assist in biasing the lock arm 28 in a direction toward the aft bulkhead 14 to prevent inadvertent lock movement. When the actuator 64 pulls the lock arm 28 in a direction toward the forward bulkhead 12, the mandrel 70 may be pushed by the lock arm 28 to slide toward the forward bulkhead 12 through the spring stop/housing pivot 80, and the second spring 72 may thereby be compressed between the lock arm/spring mandrel pivot 50 and the first spring stop 74. When the actuator 64 is not activated, the second spring stop 78 may prevent the mandrel 70 from sliding out of the spring stop/housing pivot 80.

The lock arm receiver 34, illustrated in FIGS. 6-7, may be attached to or integral with the pivot door 22 and shaped or configured to angle slightly toward the aft bulkhead 14 proximate the inner wall 18 of the fan duct 20 when the pivot door 22 is closed. The lock arm receiver 34 may comprise or have attached thereto a roller plate 82 for mating with the second portion 56 of the lock arm 28 and/or the roller 58, and a door stow engagement ramp 84. The roller plate 82 and the door stow engagement ramp 84 may be attached or integral with each other and may form a substantially triangular cross section with the lock arm receiver 34. One side of the substantially triangular cross section may be formed by the lock arm receiver 34, another side of the substantially triangular cross section facing the outer wall 16 of the fan duct 20 may be formed by the roller plate 82, and the remaining side of the substantially triangular cross-section substantially facing the inner wall 18 of the fan duct 20 and/or the aft bulkhead 14 may be formed by the door stow engagement ramp 84.

The roller 58 and/or the second portion 56 of the lock arm 28 may push down against the roller plate 82 to assist in overstowing of the pivot door 22, as described below. Furthermore, during re-stowing of the pivot door 22, the door stow engagement ramp 84 may push against the roller 58, allowing the roller 58 to roll along the engagement ramp 84, and urging the lock arm 28 to move in a direction toward the forward bulkhead 12. Once the roller 58 reaches the end of the engagement ramp 84, the biasing force of the springs 68, 72 may move the lock arm 28 toward the pivot door 22, causing the roller 58 to roll along the roller plate 82 into its locked position, as further described below.

Figure 10:
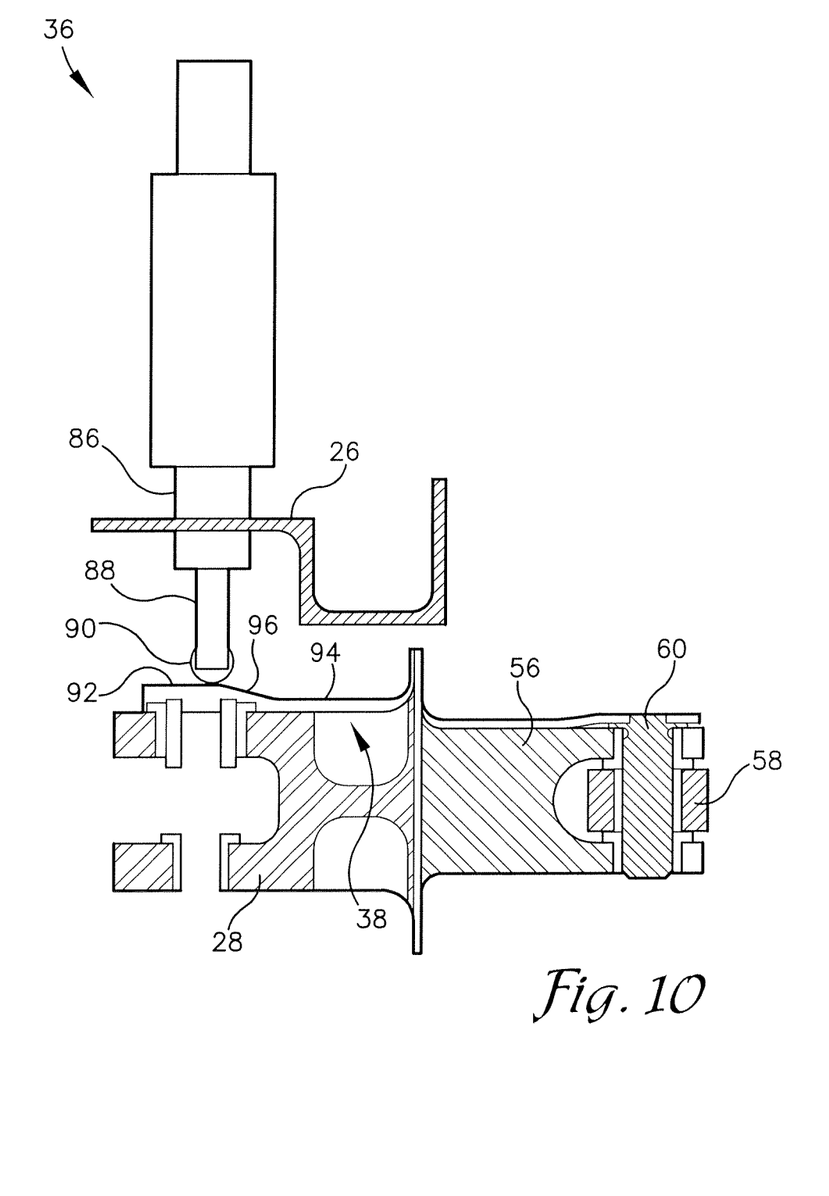
FIG. 10 is a fragmentary, cross-sectional plan view of the lock arm of FIG. 4 and an indicator switch assembly of the locking assembly.

The indicator switch assembly 36, illustrated in FIGS. 6-7 and FIG. 10, may send a signal to a pilot or a control system (not shown) to indicate if the lock arm 28 is in the locked position or the unlocked position. The indicator switch assembly 36 may comprise a switch housing 86, a depressable switch 88, and a switch roller 90. The switch housing 86 may be fixedly attached to the locking assembly housing 26.

The depressable switch 88 may be operable to be depressed at least partially into the switch housing 86 when sufficient force is applied thereto. The switch roller 90 may be attached to the depressable switch 88 at an end extending outward from the switch housing 86 such that the switch roller 90 may roll against a surface of the switch plate 38.

The switch plate 38, illustrated in FIGS. 6-7 and FIG. 10, may be fixed to or integral with the lock arm 28 and may contact the depressable switch 88 at the end extending outward from the switch housing 86 or may contact the switch roller 90. The switch plate 38 may comprise an upper portion 92, a lower portion 94, and a ramp portion 96 which may extend between the upper portion 92 and the lower portion 94. When the indicator switch assembly 36 is over the upper portion 92 of the switch plate 38, such that the switch roller 90 or depressable switch 88 is in contact with the upper portion 92, the depressable switch 88 may be at least partially depressed into the switch housing 86 and be held in a depressed position. When the indicator switch assembly 36 is over the lower portion 94 of the switch plate 38, such that the switch roller 90 or depressable switch 88 is in contact with the lower portion 94, the depressable switch 88 may be extended or biased further out from the switch housing 86 in a released position.

For example, if the depressable switch 88 is depressed, then a signal may be sent to notify the pilot or control system that the lock arm 28 is in the unlocked position. If the depressable switch 88 is released or not depressed then a signal may be sent to notify the pilot or control system that the arm is in the locked position. However, the switch plate 38 may also be designed such that the depressable switch 88 is in the released position when the lock arm 28 is unlocked and in the depressed position when the lock arm 28 is locked without departing from the scope of the invention. Additionally, the ramp portion 96 and the switch roller 90 may provide for a smooth transition between the depressed position and the released position of the switch, but the ramp portion 96 and the switch roller 90 may be omitted without departing from the scope of this invention.

Additionally, the indicator switch assembly 36 and the switch plate 38 may indicate that the lock arm 28 is in the unlocked position if at least one of the pivots of the lock arm 28 or the lock arm 28 itself breaks. For example, the locking assembly 10 may be configured such that if the second portion 56 of the lock arm 28 breaks or otherwise fails, the switch plate 38 will react by moving to the unlocked position.

Figures 11, 12:
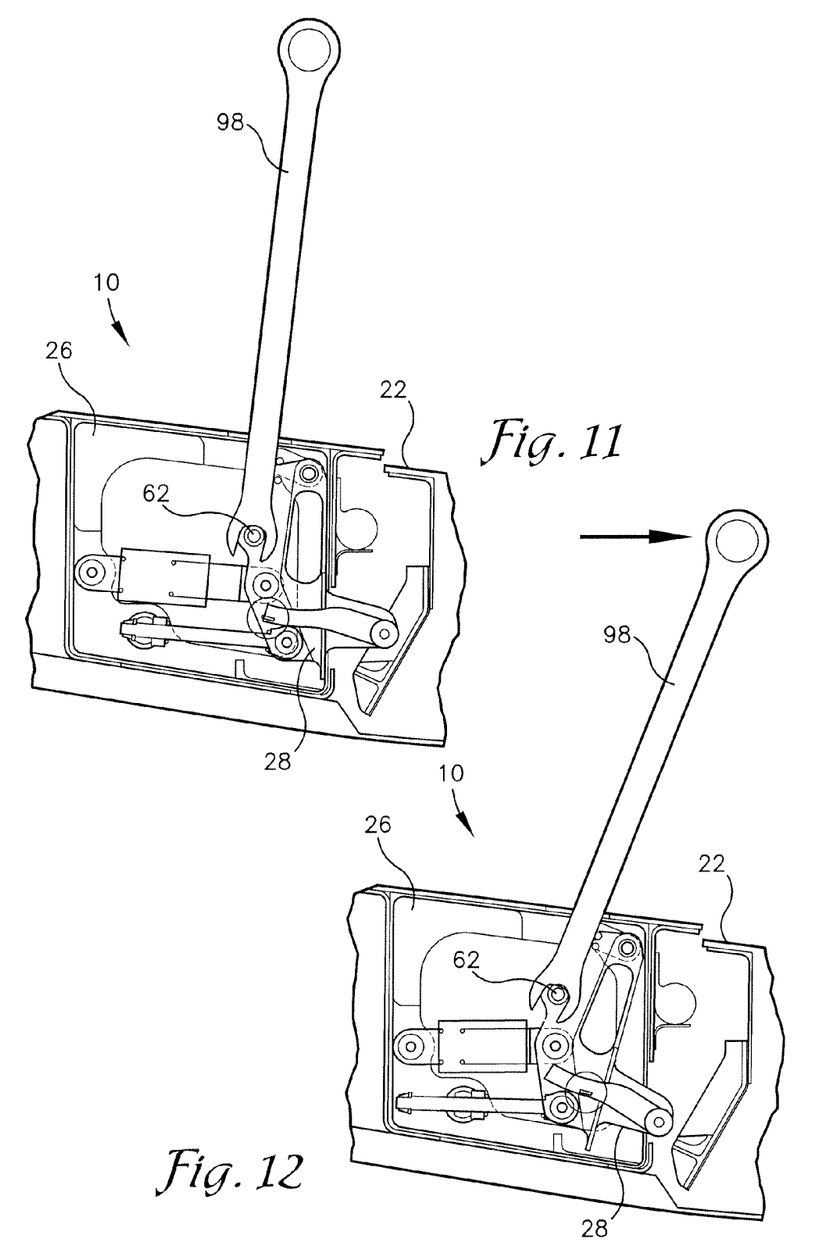
FIG. 11 is a fragmentary, cross-sectional elevation view of the locking assembly of FIG. 4 illustrating the insertion of a wrench for manually unlocking the locking assembly.
FIG. 12 is a fragmentary, cross-sectional elevation view of the locking assembly of FIG. 4 illustrating the motion of the wrench for manually unlocking the locking assembly.

In use, the second portion 56 and the roller 58 of the lock arm 28 may rest against the roller plate 82 when the lock arm 28 is in the locked position and the pivot door 22 is stowed, thereby blocking the pivot door 22 from inadvertently opening outward. To unlock the locking assembly 10, the lock arm actuator assembly 30 may be actuated to laterally retract a portion of the actuator assembly 30, thereby moving the lock arm 28 toward the forward bulkhead 12. To manually unlock the locking assembly 10, a user may engage a wrench 98, as illustrated in FIGS. 11-12, with the manual release fixture 62 and may provide torque to pivot the wrench 98 in a direction toward the aft bulkhead 14 such that the lock arm 28 may pivot about the lock arm/housing pivot 40.

Because the lock arm 28 is attached to the locking assembly housing 26 by the lock arm/housing pivot 40 at one end, its movement can not be lateral, but rather must pivot about the lock arm/housing pivot 40, following a substantially circular rotational path. So, for example, as the portion of the actuator assembly 30 retracts laterally, the lock arm/actuator pivot 48 may allow the lock arm 28 to pivot in a clockwise direction relative to the lock arm/housing pivot 40 while the actuator assembly 30 may react by pivoting counterclockwise about the actuator/housing pivot 66. Similarly, the lock arm/spring mandrel pivot 50 may allow the spring mandrel assembly 32 to respond to clockwise pivoting motion of the lock arm 28 by pivoting the mandrel 70 counterclockwise about and sliding the mandrel 70 aft relative to the spring mandrel/housing pivot 80.

The second portion 56 of the lock arm 28 may be joined at an angle with the first portion 54 of the lock arm 28. Therefore, as the lock arm 28 pivots clockwise, the first portion 54 may move in a direction generally toward the forward bulkhead 12 and the outer wall 16 of the fan duct 20, while the second portion 56 and the roller 58 of the lock arm 28 may move in a direction generally toward the forward bulkhead 14 and the inner wall 18 of the fan duct 20. This motion may cause the roller 58 and the second portion 56 of the lock arm 28 to push downward against the roller plate 82 of the lock arm receiver 34 as it moves away from the lock arm receiver 34, thereby creating a slight overstow motion prior to releasing the pivot door 22. Moving the pivot door 22 to the overstow position may allow primary locks of the thrust reverser 24 to clear safety tabs of door hooks. Overstow assistance by the locking assembly 10 also may help overcome pivot door 22 deflections, which can reduce the clearance to the safety tabs. When the roller 58 reaches the end of the roller plate 82, the pivot door 22 may open outward, unimpeded by the lock arm 28.

Figure 8:
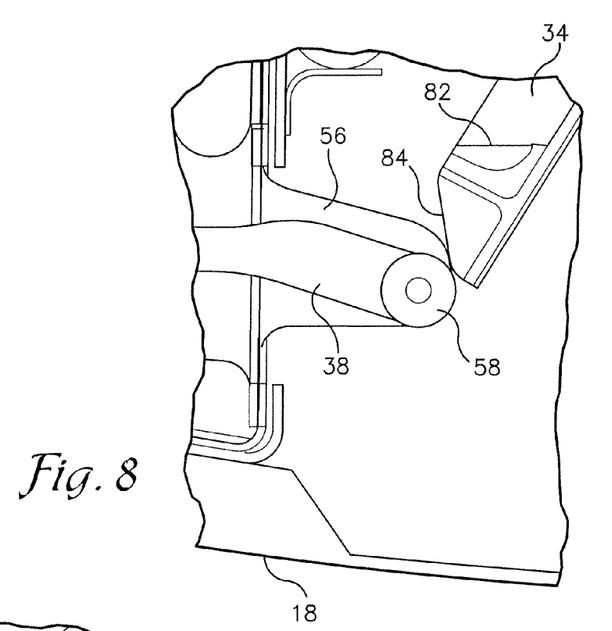
FIG. 8 is a fragmentary, cross-sectional elevation view of the lock arm of FIG. 4, illustrating the pivot door closing and the lock arm contacting a lock arm receiver of the locking assembly.
Figure 9:
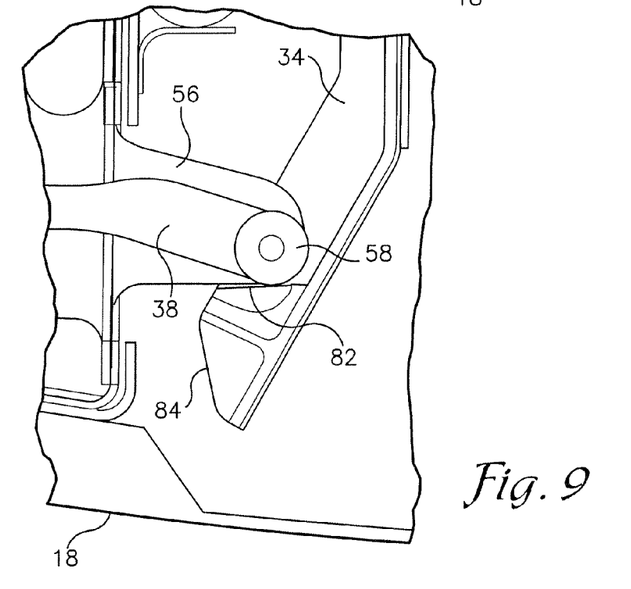
FIG. 9 is a fragmentary, cross-sectional elevation view of the lock arm of FIG. 4 in the locked position.

As the pivot door 22 is closed, the roller 58 may engage and then roll along the door stow engagement ramp 84, as illustrated in FIG. 8. The springs 68, 72 may bias the lock arm 28 and the roller 58 toward the pivot door 22, such that the roller 58 may first roll along the door stow engagement ramp 84 and then may subsequently roll along the roller plate 82 as the pivot door 22 is closed. The angle of the door stow engagement ramp 84 may be such that the lock arm 28 is pivoted away from the pivot door 22 as the roller 58 first rolls along the door stow engagement ramp 84, and then the angle of the roller plate 82 may be such that the lock arm 28 is pivoted toward the pivot door 22 as the roller 58 subsequently rolls along the roller plate 82, as illustrated in FIG. 9. As the lock arm 28 pivots back toward the pivot door 22 (when the roller 58 begins to engage the roller plate 82), the roller 58 and/or the second portion 56 of the lock arm 28 may push generally downward against the roller plate 82 until the rotational path of the second portion 56 of the lock arm 28 angles the second portion 56 of the lock arm 28 slightly upward again. This may create the slight overstow motion before allowing the pivot door 22 to reach its closed, stowed position in which an outer surface of the thrust reverser 24 is substantially flush with the outer wall 16 of the fan duct 22.

Alternatively, the actuator assembly 30 may fully retain the lock arm 28 in the unlocked position (illustrated in FIG. 7) as the pivot door 22 is closed. Other overstowing means as known in the art may be used to pull the pivot door 22 into an overstow position, then the actuator assembly 30 may push the lock arm 28 back toward the roller plate 82, into the locked position. In this alternative embodiment, the door stow engagement ramp 84 may not necessarily contact the roller 58 as the pivot door 22 is moved toward a closed and/or overstowed position.

Although the invention has been described with reference to the embodiments illustrated in the attached drawings, it is noted that equivalents may be employed and substitutions made herein without departing from the scope of the invention as recited in the claims. For example, components may be added or removed without departing from the scope of the invention.

Having thus described an embodiment of the invention, what is claimed as new and desired to be protected by Letters Patent includes the following:

1. A tertiary lock for securing a pivot door of a thrust reverser to a fixed structure of an aircraft to prevent the pivot door from inadvertently opening in a generally outward direction, the lock comprising:
   a housing fixedly attached to or integral with the fixed structure;
   a lock arm comprising a first portion inward of the housing and a second portion configured to extend at least partially outward of the housing in an aft direction through an opening of the fixed structure;
   a lock arm/housing pivot configured to pivotally attach the lock arm to the housing; and
   a lock arm receiver fixedly attached to or integral with the pivot door and configured for receiving the second portion of the lock arm, such that the lock arm prevents movement of the pivot door in the generally outward direction,
   wherein the second portion of the lock arm is configured to travel along a rotational path about the lock arm/housing pivot such that when the lock arm is pivoted away from the pivot door, at least a part of the second portion pushes inward against the lock arm receiver while simultaneously sliding or rolling in a generally forward direction along the lock arm receiver, thereby urging the pivot door in a generally inward direction, thereby overstowing the pivot door, until the lock arm pivots far enough that the second portion does not contact the lock arm receiver, thereby unlocking and releasing the pivot door to open in the generally outward direction.

2. The lock of claim 1, wherein the second portion of the lock arm is fixed to or integral with the first portion of the lock arm and extends therefrom at an angle.

3. The lock of claim 1, wherein the housing is attached to and affixed between a forward bulkhead and an aft bulkhead, and the opening through which the second portion of the lock arm extends is formed in the aft bulkhead.

4. The lock of claim 1, further comprising an actuator assembly pivotally connected to at least one of the lock arm and the housing and comprising a portion operable to axially retract in a generally forward direction away from the pivot door.

5. The lock of claim 1, further comprising a spring mandrel assembly configured to provide a load path between the housing and the lock arm, the spring mandrel assembly comprising:
   a mandrel pivotally and axially slidably connected to the housing, pivotally connected to the lock arm, and operable to slide away from the pivot doors as the lock arm is pivoted away from the pivot doors, wherein the mandrel is configured to slide axially relative to a point at which the mandrel is pivotally attached to the housing; and
   a spring configured to compress as the lock arm is pivoted away from the pivot door.

6. The lock of claim 1, wherein the lock arm further comprises a manual release fixture fixed to the lock arm and shaped and sized to mate with and be engaged by a standard wrench, such that torque applied to the wrench manually moves the lock arm into an unlocked position.

7. The lock of claim 1, further comprising a switch fixed to the housing and a switch plate fixed to the lock arm, wherein the switch plate is configured to actuate the switch depending on a position of the switch plate relative to the switch, which is dependent on the position of the lock arm to which the switch plate is fixed.

8. The lock of claim 7, wherein the switch, switch plate, and lock arm are configured such that if a portion of the lock arm structurally fails, the resulting position of the switch plate relative to the switch indicates the same position of the switch plate as when the lock is unlocked.

9. The lock of claim 1, wherein the lock arm further comprises a sealing portion configured to form an airtight seal with the fixed structure around the opening through which the second portion of the lock arm extends.

10. The lock arm of claim 1, wherein the second portion of the lock arm further comprises a roller attached to the second portion of the lock arm and configured to rotatably engage the lock arm receiver.

11. The lock arm of claim 10, wherein the lock arm receiver further comprises a roller plate angled outward and a door stow engagement ramp adjacent the roller plate and angled inward, wherein the roller is configured to rotatably engage the door stow engagement ramp and then rotatably engage the roller plate as the pivot door moves inward to a closed position.

* * * * *